United States Patent
Elcock et al.

(10) Patent No.: US 10,623,274 B2
(45) Date of Patent: Apr. 14, 2020

(54) MECHANISM AND APPARATUS FOR SET-TOP BOX POWER OFF TO INTERNET OF THINGS DEVICE STATUS DISPLAY

(71) Applicant: ARRIS Enterprises LLC, Suwanee, GA (US)

(72) Inventors: Albert F. Elcock, West Chester, PA (US); Charles Hardt, Lawrenceville, GA (US); Christopher S. Del Sordo, Souderton, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 439 days.

(21) Appl. No.: 15/376,591

(22) Filed: Dec. 12, 2016

(65) Prior Publication Data
US 2018/0167228 A1    Jun. 14, 2018

(51) Int. Cl.
*H04L 12/24*    (2006.01)
*H04L 12/28*    (2006.01)
*H04L 12/26*    (2006.01)

(52) U.S. Cl.
CPC .......... *H04L 41/22* (2013.01); *H04L 12/2823* (2013.01); *H04L 43/08* (2013.01)

(58) Field of Classification Search
CPC ...... H04L 41/22; H04L 43/08; H04L 12/2823
See application file for complete search history.

(56) References Cited

U.S. PATENT DOCUMENTS

| | | | |
|---|---|---|---|
| 9,407,624 B1* | 8/2016 | Myers | H04L 63/08 |
| 2015/0257116 A1* | 9/2015 | Frantti | H04W 60/06 370/253 |
| 2016/0203700 A1* | 7/2016 | Bruhn | G08B 25/008 340/506 |
| 2016/0337453 A1* | 11/2016 | Lee | G06F 8/38 |
| 2017/0034116 A1* | 2/2017 | Cheng | H04L 67/12 |
| 2017/0064073 A1* | 3/2017 | Spencer | H04M 1/72577 |
| 2017/0156102 A1* | 6/2017 | Singh | H04W 40/246 |
| 2017/0272506 A1* | 9/2017 | Ajitomi | H04L 67/10 |
| 2018/0113584 A1* | 4/2018 | Varadi | G06F 16/9537 |

* cited by examiner

*Primary Examiner* — Ivan O Latorre
(74) *Attorney, Agent, or Firm* — Thomas A. Ward

(57) ABSTRACT

A local area network (LAN) device pairs with an interne of things (IoT) device via a wireless mesh network and receives a status of the IoT device via the wireless mesh network. The LAN device stores the received IoT status with an IoT device identifier of the IoT device in an IoT device table in memory and detects a shutdown signal to power down the LAN device. Upon detecting the shutdown signal, the LAN device retrieves the IoT device status from an IoT device database in memory and sends the IoT device status to a display device. The set-top box retrieves a control command from a control profile based on received input to control the IoT device and transmits the retrieved IoT device control command to the IoT device via the wireless mesh network.

16 Claims, 8 Drawing Sheets

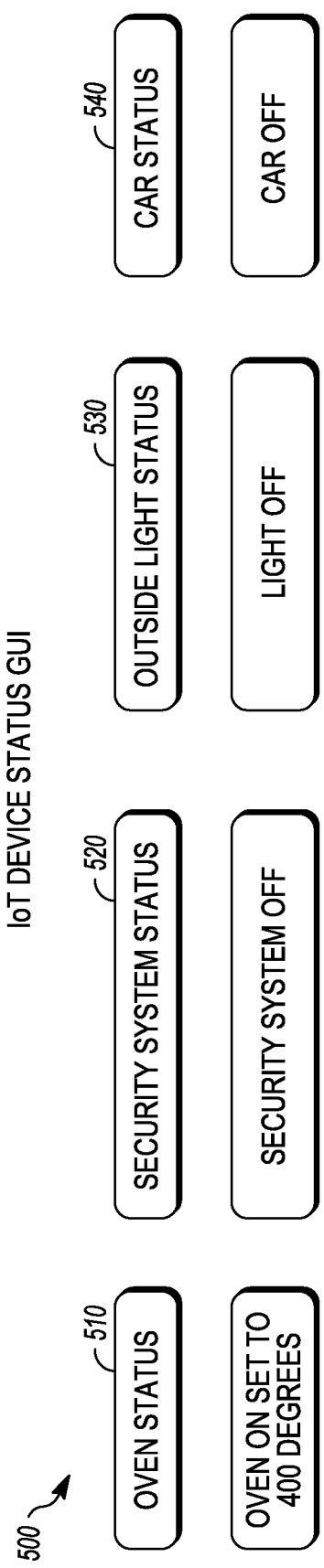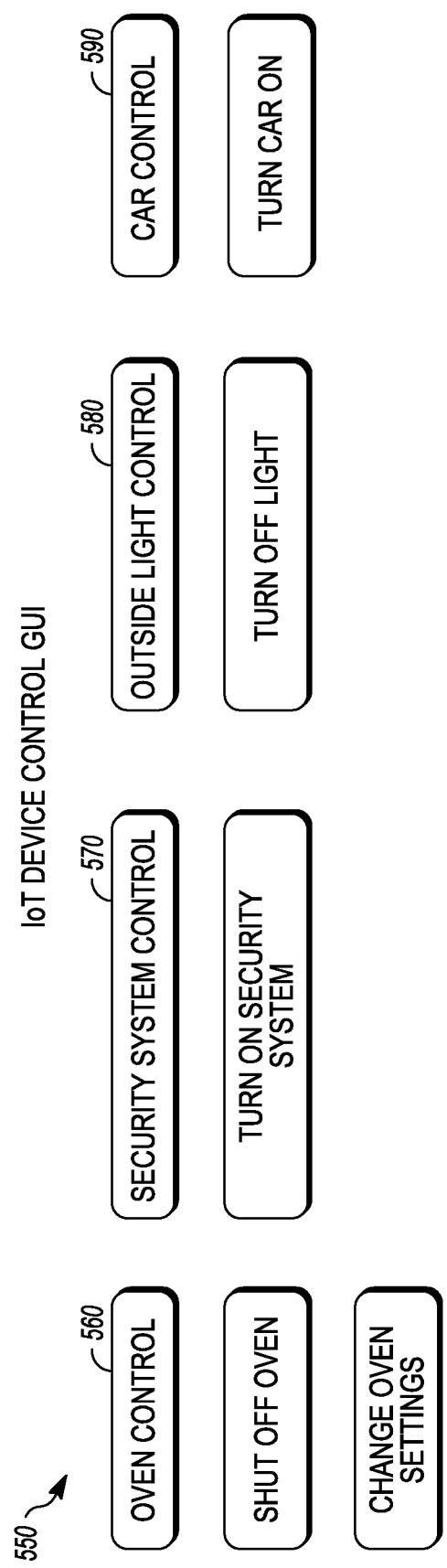

(12) United States Patent
US 10,623,274 B2

MECHANISM AND APPARATUS FOR SET-TOP BOX POWER OFF TO INTERNET OF THINGS DEVICE STATUS DISPLAY

TECHNICAL FIELD

The examples described herein, in general, relate to techniques and equipment to obtain internet of things (IoT) device status via a local area network (LAN) device and controlling IoT devices.

BACKGROUND

An IoT device is a device that connects wirelessly to a network and has the ability to be controlled by or transmit data to another device on the network. Some IoT devices include home appliances (e.g., ovens and refrigerators), thermostats, lights, water heaters, door locks, cars, and medical devices (e.g., pacemakers and implants). It is envisioned that IoT devices will someday work together for people at home and in industry.

There has been a significant increase in the use of IoT devices within the home that have Bluetooth, Digital Enhanced Cordless Telecommunications (DECT), Near Field Communication (NFC) and/or ZigBee wireless support. These IoT devices can communicate with other devices to carry out functionality, such as home automation based features. Unfortunately, communication and control of such IoT devices via one or more customer premises equipment (CPEs), such as a set-top box, set-top gateway, or WiFi routers on a cable or fiber optic network is limited.

SUMMARY

In an example, a local area network (LAN) device includes a wireless mesh network communication interface for communication over a wireless mesh network, a LAN communication interface for communication over the LAN, a processor coupled to the wireless mesh and LAN network communication interfaces, a memory accessible to the processor, and programming in the memory. Wireless mesh networks in this scenario can be both Bluetooth/ZigBee and Wi-Fi if the LAN is WiFi based. Of course, some topologies can use Ethernet or MoCA® as a means of LAN connectivity and wireless Bluetooth/ZigBee communication to the IoT devices. A grouping of the LAN based identifiers with the IOT device identifiers of the IoT devices that are paired to the LAN based devices is stored. Pairing occurs between the LAN based devices and the IoT devices throughout the house. Management of the identifiers is used to communicate the IoT status and control from a central point where the consumer interfaces to the system. For example, a consumer interface device, such as a mobile device (e.g., smartphone, laptop computer, or tablet), digital television, or set-top box allows the consumer to interface the system.

Execution of the programming by the processor configures the LAN device to perform functions, including functions to pair the LAN device with an internet of things (IoT) device via the wireless mesh network and receive a status corresponding to an overall status of the IoT device or the status of a feature of the IoT device via the wireless mesh network. The programming in the memory further configures the processor to store the received IoT status with an IoT device identifier of the IoT device in an IoT device table in the memory and detect a shutdown signal to power down the LAN device. The programming in the memory further configures the processor to upon detecting the shutdown signal, retrieve an IoT device database including the IoT device status from the memory, and send the IoT device status to a display device, such as a mobile device, television, or video monitor for display for a predetermined time period.

In an example, a method includes receiving at a network gateway via a local area network (LAN), a first internet of things (IoT) device table from a first LAN device, the first IoT device table having at least one IoT device entry corresponding to an IoT device that includes at least one controllable feature. The IoT device entry includes (i) a LAN device address of the first LAN device, (ii) information identifying the IoT device, (iii) a feature identifier of the controllable feature, and (iv) a feature status of the controllable feature. The method further includes storing the first IoT device table in an IoT device database and periodically receiving an update of the feature status of the IoT device from the first LAN device. The method also includes receiving a request for the IoT device database from a second LAN device via the LAN and in response to receiving the IoT device database request, retrieving the first IoT device table from the IoT device database and sending the first IoT device table to the second LAN device.

In an example, a non-transitory machine-readable medium contains machine-readable programming instructions to cause a local area network (LAN) device to pair with an internet of things (IoT) device via a wireless mesh network by receiving information of the IoT device, assigning an IoT device identifier to the IoT device, generating an IoT device entry in an IoT device table stored in a memory, and storing the IoT information and the IoT device identifier in the IoT device entry. The instructions further cause the mobile device to receive a status of the IoT device via the wireless mesh network, store the received IoT device status in the IoT device entry with the IoT device serial or model number and the IoT device identifier, and send the IoT device table to a network gateway. Identification of the LAN based device that is paired to the IoT device can be stored in the central repository of information.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one or more implementations in accordance with the present teachings by way of example only, not by way of limitation. In the figures, like reference numbers refer to the same or similar elements.

FIG. 5A shows a graphical user interface of the set-top box for displaying IoT device status.

FIG. 5B shows a graphical user interface of the set-top box for controlling IoT devices.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

Figure 1:
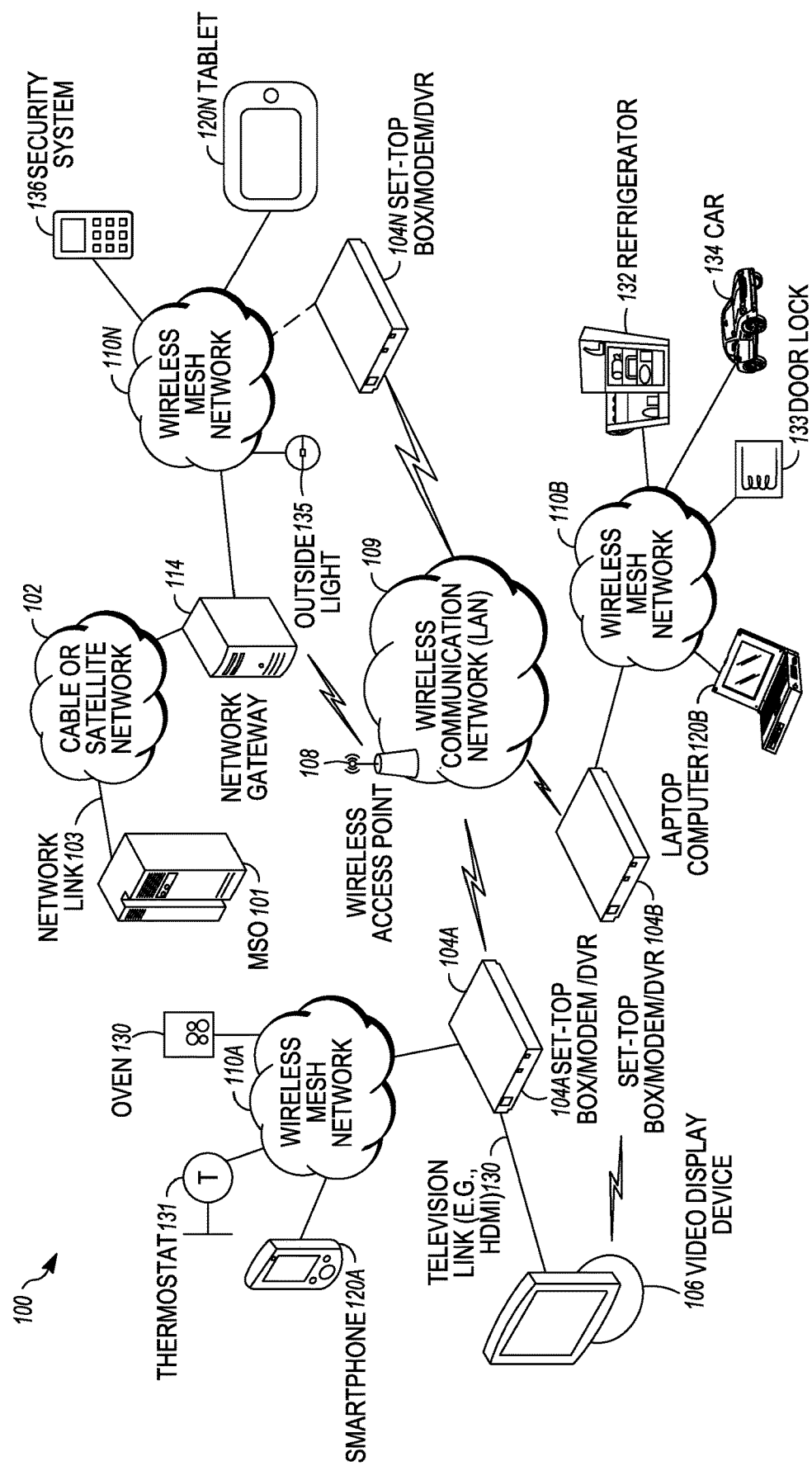
FIG. 1 is a block diagram of a system for displaying IoT device status on a television.

Shown in the block diagram of FIG. 1 is a system 100 for displaying IoT device status on a video display device (e.g., a digital television display) 106. The example system 100 includes N set-top boxes 104A-N, a network gateway 114, IoT devices 130-136, and mobile devices 120A-N. Set-top boxes 104A-N and network gateway 114 are in communication with a multiple-system operator (MSO) server 101. The physical network link of the network gateway 114 and set-top boxes 104A-N to the cable or satellite network 102 may be an optical fiber and/or cable link to a cable TV network. MSO server 101 receives communication signals (e.g., cable television and Internet data signals), processes the signals, and distributes the television and Internet data signals across the cable or satellite network 102. As shown, the example MSO server 101 is connected to a television system and Internet network, such as cable or satellite network 102, via a network link 103. The network link 103 can be a coaxial and/or optical connection.

System 100 includes at least one optical or cable network compatible video receiver and decoder (colloquially referred to as a "set-top box"), a smart television, a modem and/or a digital video recorder (DVR) as shown generally at 104A-N. For convenience, we will generally refer to each of the devices 104A-N as a set-top box (STB). Set-top boxes 104A-N N may reside in many rooms of a building, such as a home, office, or hospital, and be able to access various IoT devices 130-136 throughout the building.

STB 104A is in communication with network gateway 114 through a set-top box network link (e.g., wireless network communication interface, coaxial cable, optical fiber cable, Ethernet, etc.) and is also connected to digital television and/or video monitor 106 via a video data link 130, such as a high definition multi-media interface (HDMI) connector. If the monitor 106 is equipped with a network communication interface (e.g., a Smart digital television), then monitor 106 can also be in communication with the network gateway 114 directly, in which case monitor 106 may operates in a manner similar to set-top boxes 104A-N or mobile devices 120A-N. For example, a digital television monitor 106 can be connected directly to network gateway 114 via a wired or wireless network connection. Although not shown, STB 104A-N may also be in direct communication with MSO 101 via cable or satellite network 102 using a separate network link (e.g., coaxial or optical cable connection).

A local area network (LAN) 109 is also included, shown as a wireless communication network 109. LAN 109 may be wired or wireless. Communication network 109 can be via Wi-Fi, MoCA®, Ethernet, or a wireless mesh network (e.g., an upper tier wireless mesh network). System 100 also includes end user devices, including mobile devices such as a smartphone 120A, laptop/personal computer 120B, and a tablet computer 120N. LAN 109 includes a wireless access point 108 (e.g. Wi-Fi access point/router) and network gateway 114; although other in-home networking technologies may be used. As shown, network gateway 114 communicates to the LAN 109 and may also communicate via a wireless mesh network 109N.

The wireless access point 108 and network gateway 114 enable the STBs 104A-N, network gateway 114, and mobile devices 120A-N to communicate with each other over LAN 109 and utilize services offered through the cable or satellite network 102, such as for Internet access and media content distribution. The network gateway 114 is a data device that provides access between a wide area network (WAN), such as 102, and the LAN 109 at the premises (for use by devices communicating through the local on-premises network).

Wireless access point 108 can be a Wi-Fi access point/router that indirectly connects to the cable or satellite network 102 through the network gateway 114. However, the wireless access point 108 may optionally connect to the cable or satellite network 102 via a direct network link. In this example, wireless access point 108 may be both a Wi-Fi access point/router and the network gateway 114 that directly connects to the cable or satellite network 102. Accordingly, the wireless access point 108 can behave as a transport box like network gateway 114 by pushing data back to the MSO server 101. The wireless access point 108 and network gateway 114 provide routing, access, and other services for the end user equipment operating at the premises. Wireless access point 108 may also include sufficient storage to support communications involving IoT device status and controlling IoT devices 130-136.

In the example, network gateway 114 communicates with all set-top boxes 104A-N to aggregate statuses of all IoT devices 130-136 across wireless mesh networks 110A-N and transmits the statuses of all IoT devices 130-136 across the LAN 109. Since network gateway 114 is connected to the customer's LAN 109, and is not typically turned off, accessed through the network gateway 114 may include a centralized IoT device repository, referred to as IoT device database. The IoT device database includes statuses and data regarding all IoT devices across wireless mesh networks 110A-N. The IoT device database, however, can be transferred to or distributed among any or all of the set-top boxes 104A-N. The example set-top boxes 104A-N and mobile devices 120A-N also have the ability to gather IoT device status information, including individual feature status, of respective IoT devices 130-136 with which the set-top boxes 104A-N and mobile devices 120A-N are in communication.

One type of communication link between the set-top boxes 104A-N and the IoT devices 130-136 is established by pairing an STB with one or more of the IoT devices. Pairing may involve identifying, at the STB, the manufacturer or model information of an IoT device and determining whether the IoT device has a version of the wireless mesh network protocol to perform/support the requested IoT device services (e.g., whether the IoT device will respond to requests for feature status and accept control commands). This information may be obtained, for example, via a device discovery protocol. For example, set-top boxes 104A-N and mobile devices 120A-N query for product-based information (e.g., type of IoT device, such as oven), whether the IoT device has a particular feature (e.g., convection), and feature status (e.g., oven is on/off or current temperature setting). During pairing, an IoT device table may be built one entry at a time by populating the table with the discovered IoT device information. While the IoT devices 130-136 continue to operate/run, set-top boxes 104A-N and mobile devices 120A-N may continually query IoT devices 130-136 regarding status. Alternatively, the IoT table may be maintained on an event-driven basis in which the IoT devices notify the set-top boxes 104A-N when there has been a change in status. When an IoT device 130-136 shuts down cleanly, the IoT device 130-136 may be removed from the IoT device database; otherwise, the IoT device 130-136 can be removed from the from the IoT device database after a predetermined period of being non-responsive.

In an exemplary pairing process, a respective set-top box 104A-N may be paired with a particular Bluetooth, DECT, NFC or ZigBee speaker or headset type IoT device through a discovery message that provides model information, feature information, and status. This information is collected in an IoT device table at a respective set-top box 104A-N. Also stored in the IoT device table is a unique identifier of the IoT device on the respective wireless mesh network 110A-N. For example, the Bluetooth, DECT, NFC or ZigBee network address of the IoT device 130-136 is stored when the IoT device 130-136 is directly paired with the set-top box 104A-N, otherwise the IP address of the mobile device 120A-N to which the IoT device 130-136 is paired is stored in the IoT device table.

In one implementation, a standardized control profile is available for the speaker or headset type IoT device, and that standardized protocol is selected during the pairing process. The selected control profile is subsequently used during communications of IoT device status (e.g., volume setting) with the speaker or headset as well as during transmission of control commands to adjust the settings (e.g., volume) of the IoT device. If the speaker or headset IoT type device is paired with a mobile device 120A-N, then control commands from network gateway 114 can be sent directly from the network gateway 114 to the mobile device 120A-N via the LAN 109 instead of via a set-top box 104A-N over a respective wireless mesh network 110A-N. In other words, control commands and IoT device status are sent and received via the downstream mobile device 120A-N that is controlling the IoT device 130-136 over the wireless mesh network 110A-N. Accordingly, mobile devices 120A-N and set-top boxes 104A-N can communicate via both the LAN network 109 and a respective wireless mesh network 110A-N.

Subsequently, if the mobile device 120A-N with which the speaker or headset type IoT device is paired is powered off, then the network gateway 114 or the set-top box 104A-N that is in closest proximity with the speaker or headset type IoT device can reach out to the speaker or headset type IoT device to take over the control function. Such communication may be via the LAN 109 or wireless mesh networks 110A-N in order to continue to receive updates to the IoT device status and control the speaker or headset type IoT device.

Pairing of IoT devices across wireless mesh networks 110A-N and propagation of IoT device status across LAN 109 is dynamic. For example, the IoT device database can be continually adjusted as IoT devices 130-136 join, move among or depart networks 110A-N. Network gateway 114. Set-top boxes 104A-N may maintain the IoT device table/database as IoT devices 130-136 and mobile devices 120A-N are added, moved or replaced on the wireless mesh networks 110A-N. This adjustment of the listing of IoT devices 131-136 and their respective IoT device status in the IoT device database may occur at runtime (e.g., when outside light 135 is turned on). IoT device information (range oven/stove manufacturer, model no., serial no., etc.) is stored in the IoT device database of the network gateway 114, for example. The IoT device database of network gateway 114 can be constantly updated, using synchronous or asynchronous communication with set-top boxes 104A-N and IoT devices 130-136. Although the described device information includes information specific to the device, it is contemplated that a device may provide information generic to a set of devices, regardless of the manufacturer or model number of the device. For example an IoT device may be a switchable electrical outlet that corresponds to an industry standard. The device information in this instance may be an identification of the industry standard.

Because of the presence of various mesh networks 110A-N throughout the building and short range limitations of certain wireless mesh networks (e.g., Bluetooth), IoT device database may also store the identifier of the particular set-top box 104A-N, network gateway 114, and/or mobile device 120A-N that each IoT device 130-136 is currently paired with. For example, the IoT device database of network gateway 114 stores the internet protocol (IP) address of set-top box 104A, network gateway 114, mobile device 120A for the oven 130. The IoT device database may also store the controllable features of each IoT device 130-136 and the current status of each feature. For example, if there are five controllable features in oven 130, then the status of each of the five features is presented (e.g., oven is on/off or current temperature of oven). An example IoT device database may be utilized to generate the GUIs with IoT device model information and status, as shown in FIGS. 5A-B. The database allows the user to interact with IoT devices 130-136, for example, by controlling features of IoT devices 130-136 using the set-top box 104A or mobile device 120A.

During or after pairing, mobile devices 120A-N, propagate the IoT device status to a respective one of the set-top boxes 104A-N on the wireless mesh network 110A-N. Set-top boxes 104A-N transmit the collected IoT devices status to the network gateway 114 asynchronously 114. Alternatively, the IoT devices may be polled by the network gateway 114 to obtain status information at regular intervals. The Bluetooth protocol, for example, offers both asynchronous and synchronous notification. Synchronous notification can be based on a system timer, however, synchronous communications may expend valuable computing resources, such as network bandwidth, memory space, and CPU processing, which can lead to service slowdowns or disruptions. To avoid such potential service slowdowns or disruptions, asynchronous notification may be used, for example, IoT device status may be pushed out by each of the IoT devices or obtained by polling from the set-top box only when a set-top box 104A-N is powered down or within a predetermined time period (e.g., within 5 seconds) after the set-top box is powered down.

With respect to FIG. 1, examples are described in which a variety of IoT devices 130-136 are in communication over wireless mesh networks 110A-N with a respective set-top box 104A-N or network gateway 114. The wireless mesh networks 110A-N may be a short range network, Bluetooth, DECT, NFC, ZigBee, or any protocol in which IoT devices 130-136 may be linked (e.g. paired) with a particular set-top box or gateway, for example. Set top boxes 104A-N provide support to pair IoT devices 130-136 such as the oven 130, thermostat 131, refrigerator 33, home door lock 133, car 134, outside light 135, and security system 136 via respective wireless mesh networks 110A-N. A customized http restful protocol may be used between the IoT devices 130-136 to/from the set top boxes 104A-N. Such a customized HTTP restful protocol may provide device status of in-home IoT devices 130-136 at any moment in time and allow for the devices to be controlled through one or more of the networks 110A-N. The customized HTTP restful protocol can be customized to ask for IoT device status, for example, to determine whether car 134 is running or not running.

As shown, wireless mesh network 110A includes set-top box 104A, smartphone 120A, oven 130, and thermostat 131. Oven 130 and thermostat 131 may communicate directly with set-top box 104 via the wireless mesh network 110A or be paired with smartphone 120A. Smartphone 120A then, in turn may communicate the status of oven 130 and thermostat 131 and may responsively control oven 130 and thermostat 131.

Once configured, the set top boxes 104A-N communicate with the IoT devices 130-136 within the consumer's residence to begin to control and/or to obtain runtime status relevant to the features that the consumer has enabled. Thus, when an individual set top 104A-N or network gateway 114 is turned off, the current status of devices coupled to the set-top box 104A is ready to be displayed. Wireless mesh networks 110A-N, such as ZigBee, DECT, NFC or Bluetooth, do not have great range, hence multiple set top boxes 104A-N may be used to communicate over LAN 109 to connect to the network gateway 114. Using the LAN 109 to transmit IoT device status between set-top boxes 104A-N increases the reach to all IoT devices 130-136 within the consumer's residence. As described above, it is contemplated that MoCA® or Ethernet technology can be used instead of an entirely wireless LAN 109.

When the consumer powers off set-top boxes 104A-N, network gateway 114, or wireless access point 108 (e.g., the off key is pressed), the consumer is typically still looking at the television 106 screen and is also in a situation where the consumer may spend some time checking the status of specific IoT devices by going to each IoT device 130-136 inside or outside the house. For example, when the consumer finishes watching television 106 and powers off set-top boxes 104A-N at night before bed, or just before the consumer leaves the house, the consumer wants to be sure the oven 130 is off, the security system 136 alarm is set, or the outside light 135 is shut off. The present disclosure provides the capability for the consumer to check IoT device status and control IoT devices 130-136 (e.g., Bluetooth, DECT, NFC or ZigBee enabled devices) just after set-top boxes 104A-N are powered off. Embodiments also allow the consumer to control IoT devices 130-136 via interaction with set-top boxes 104A-N if the viewed status of an IoT device 130-136 is in a state that is not deemed correct. For example, using the wireless interface, the consumer can turn off the oven 130 if the oven 130 was on. The connections among network gateway 114 and wireless access point 108 and the set-top boxes 104A-N via the LAN 109 may be utilized to access various IoT devices 130-136 that are located near set-top boxes 104A-N and network gateway 114 within the building (e.g., home).

Device status can be sent from all set-top boxes 104A-N to the particular set-top box 104A-N that is being powered off. The more set-top boxes 104A-N, the better chance to pair all IoT devices 130-136 within the consumer's residence. The LAN 109 connection between set-top boxes 104A-N that are paired to IoT devices 130-136 allows automated IoT device status checking and control of the IoT devices 130-136 by the consumer which, for example, can be triggered by the consumer's powering off any one of the set-top boxes 104A-N.

Figure 2:
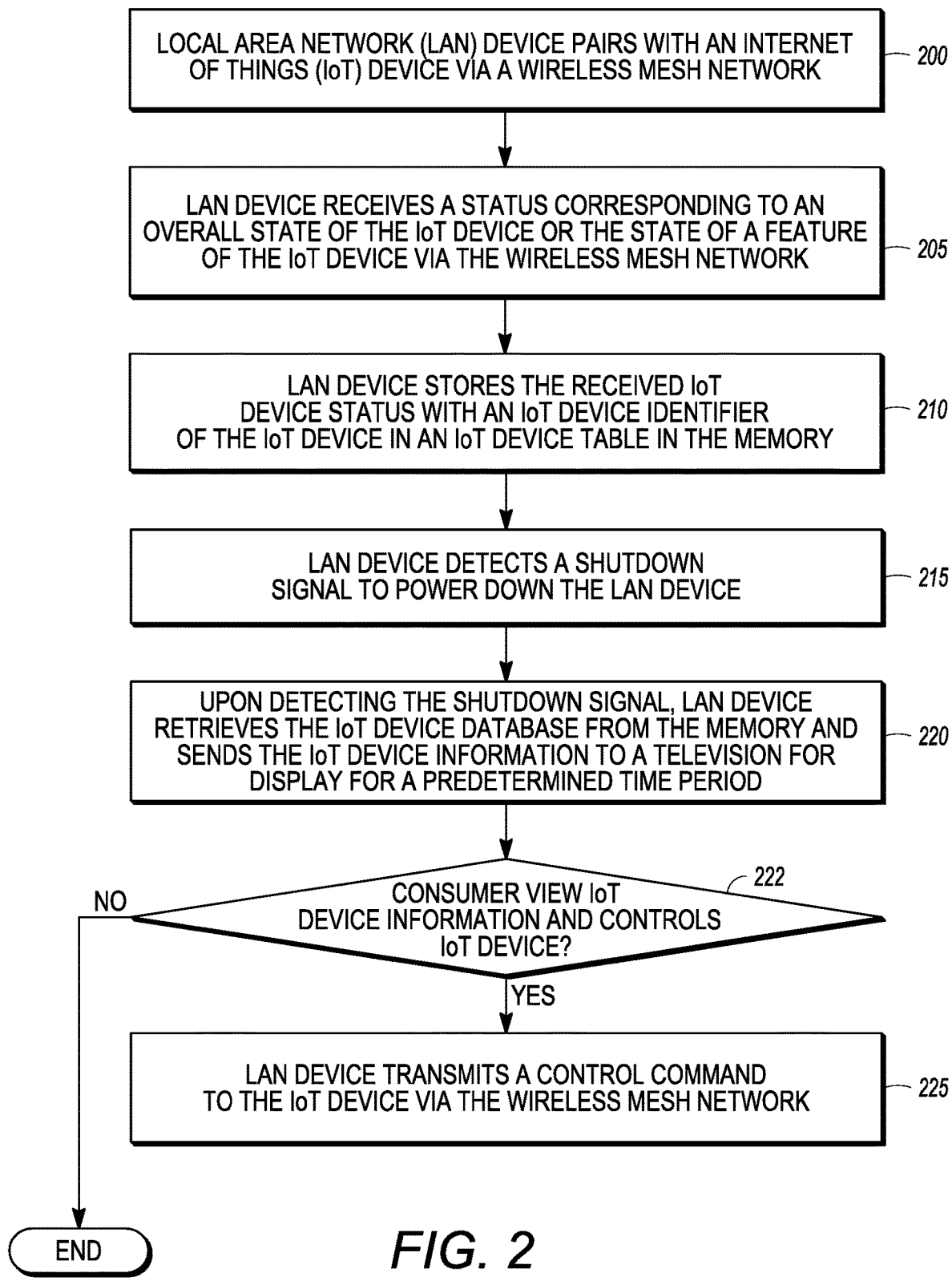
FIG. 2 is a flowchart of the operation of the set-top box in FIG. 1, when processing IoT device status, such as via a wireless mesh network, and displaying IoT device status on a television.

FIG. 2 illustrates a procedural flow executed on a LAN device, such as the set-top box 104A in FIG. 1, when processing IoT device status, such as via a wireless mesh network 110A, and displaying IoT device status on a digital television monitor 106. Although shown as occurring serially, the blocks of FIG. 2 may be reordered or parallelized depending on the implementation, as discussed below. It should be understood that the LAN device can be any LAN-based device that is in communication with the LAN 109, such as mobile devices 120A-N (e.g., smartphone, laptop computer, or tablet), digital television 106, network gateway 114 or set-top boxes 104A-N.

Beginning in step 200, set-top box 104A pairs with an IoT device 130 via the wireless mesh network 110A. Pairing with the IoT device 130 (oven) includes receiving information about the device, such as its serial or model number of the IoT device 130, assigning an IoT device identifier to the IoT device 130, generating an IoT device entry in an IoT device table, and storing the IoT device serial or model number and the IoT device identifier in the IoT device entry. Although this operation is described as "pairing" it is not limited to Bluetooth pairing but may include any similar protocol by which two devices are linked for control or to obtain status information. Again, other LAN based devices can be used in lieu of set-top box 104A to pair with IoT device 130, such as a digital television 106, network gateway 114, or mobile devices 120A-N (smartphone, laptop computer, tablet). Such LAN based devices can provide a GUI that displays IoT device status and allows IoT devices to be controlled (e.g., behave as a consumer interface device).

Moving to step 205, set-top box 104 receives a status corresponding to an overall state of the IoT device 130 or the state of a feature of the IoT device 130 via the wireless mesh network 110A. After pairing, set-top box 104A recognizes that the paired IoT device 130 supports IoT device status collection and control protocols, and can pass the IoT device status to other set-top boxes 104B-N and gateway 114. The set-top box 104A may also control IoT device 130 by sending control messages/commands via wireless mesh network 110A, for example. It should be understood that each of set-top boxes 104B-N and gateway 114 also behave as wireless mesh network 110B-N controllers that gather the statuses of IoT devices 132-136 (e.g., Bluetooth, DECT, NFC or ZigBee) that they are paired with during runtime operation.

In step 210, set-top box 104 stores the received IoT device status with the IoT device identifier of the IoT device 130 in an IoT device table in the memory. The received IoT device status is stored in the IoT device entry with the IoT device information and the IoT device identifier. The IoT device identifier can be a Bluetooth, ZigBee, DECT, NFC or other network address. The entry of the IoT device table can further include an identifier of the set-top box 104A or a mobile device 120A that the IoT device is paired with. For example, the identifier of the set-top box 104A or the mobile device 120A that the IoT device 130 is paired with is an internet protocol (IP) address that may be used to reach back out to the IoT device 130 to obtain updated IoT device status and send control commands (e.g., to turn the oven 130 off). The example entry in the IoT device table further includes each feature of the IoT device 130 that is controllable and status of each IoT device controllable feature.

Although not shown, in the example, set-top box may 104A also receive the IoT device serial or model number of a second IoT device 131 (thermostat) and the status of the second IoT device 131 from a mobile device 120A (smartphone) via the LAN 109. In this example, the second IoT device 131 is paired with mobile device 120A. Consequently, set-top box 104A generates a second IoT device entry in the IoT device table and stores the second IoT device information (e.g. serial or model number), the second IoT device identifier, and the second IoT device status in the second IoT device entry. The second IoT device identifier may be the internet protocol (IP) address of the mobile device 120A.

When it is being powered off, set-top box 104A can also interact with other set-top boxes 104B-N and gateway 114 to gather statuses of other IoT devices 132-136 to present to the consumer who has powered off set-top box 104A. For example, set-top box 104A transmits the IoT device status of IoT devices 130-131 over the LAN 109 to a second set-top box 104B via a network gateway 114. In response, set-top box 104A receives over the LAN 109 via the network gateway 114 statuses of other IoT devices 132-134 (refrigerator, door lock, car) paired with the second set-top box 104B via a second wireless mesh network 110B. In this example, set-top box 104A stores the received other IoT device statuses in memory in the IoT device table. Alternatively, the device statuses may be stored among the set-top boxes 104A-N and the set-top box 104A, upon being powered off, may access the IoT device status information from the other set-top boxes 104B-N.

Continuing to step 215, set-top box 104A detects a shutdown signal to power down the set-top box 104A. The set-top box 104A can receive the other IoT device statuses (e.g., IoT device database) before or after detecting the shutdown signal.

Proceeding to step 220, upon detecting the shutdown signal, set-top box 104A retrieves the IoT device status information (e.g., IoT device database) from the memory and sends the information to the digital television monitor 106 for display for a predetermined time period. For example, right after the consumer powers off set-top box 104A, a GUI screen is generated by set-top box 104A that displays the IoT devices 130-131 and their respective statuses to the consumer. In response to receiving over the LAN 109 via the network gateway 114 the statuses of other IoT devices 132-134 from set-top box 104B, the set-top box 104A also provides the received other IoT device statuses in the generated GUI screen for display on the television monitor 106 upon detecting the shutdown signal. The centralized IoT device database repository that is maintained stores the IoT status of all IoT devices paired with the various LAN devices throughout the consumer's premises and this IoT device database is gathered and displayed to the consumer by a consumer interface device, such as set-top box 104A. Other consumer interface devices can include digital television 106 and mobile devices 120A-N.

The display can be activated based on a timer and displayed for the length of a timeout period. Once the display is complete, set-top box 104A enters the power off state. The consumer can also terminate the display via another power off command prior to the display timeout period. It is assumed that the remote control is not configured to control both set-top box 104A and the television monitor 106 and thus, the power off command for the set-top box does not power down the television. Alternatively, the remote control may be configured to delay the power off command for the monitor for an amount of time sufficient to implement the display. Alternatively, the set-top box 104A may include an IR blaster that turns on the monitor 106 after it has been turned off using the remote control.

In this example, the IoT device status is displayed for a period of time so the consumer can quickly check the status to be sure the IoT devices 130-136 are in proper per state just after the set-top box 104A is powered off. The consumer can control each IoT device to set the IoT device status to a specific state via wireless mesh network messaging (e.g., Bluetooth, DECT, NFC or ZigBee-based) after the power off state.

In step 222, the consumer has viewed the status of all IoT devices paired on the consumer premises and decides to change configuration of an IOT device. Finishing now in step 225, since the consumer has selected to control an IoT device. then step 225 occurs. Set-top box 104A transmits a control command to the IoT device 130 via the wireless mesh network 110A. For example, in response to sending the IoT device status for display, set-top box 104A receives an input to control an IoT device feature. Set-top box 104A accesses a control profile of the IoT device 130 from the memory that includes controllable features of the IoT device 130 and corresponding control commands to adjust the controllable features. Set-top box 104A retrieves a control command from the control profile based on the received input to control the IoT device feature. Set-top box 104A then transmits the retrieved IoT device control command to the IoT device 130 via the wireless mesh network 110A. When a command is sent, the set-top box 104A may remain powered on and keep the monitor 106 powered on for an amount of time to confirm that the IoT device acted upon the command. Thus, the set-top box 104A may display the status of the controlled IoT device after the device has executed the command.

Figure 3:
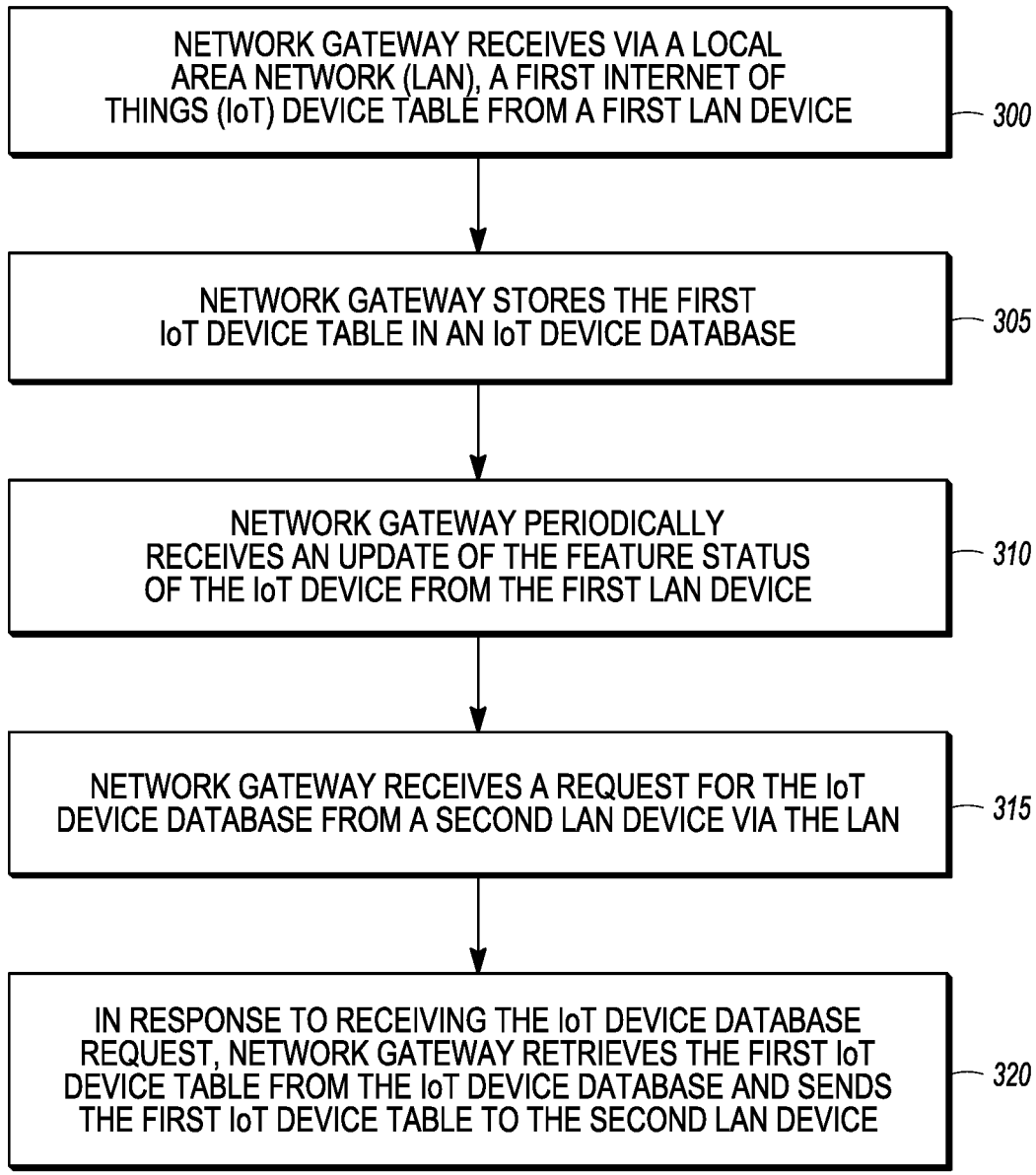
FIG. 3 is a flowchart of the operation of the network gateway in FIG. 1, when processing IoT device status, such as during communications with two different set-top boxes over a local area network.

FIG. 3 is a procedural flow of the operation of the network gateway 114 in FIG. 1, when processing IoT device status, such as during communications with two different LAN devices, such as set-top boxes 104A-B over a LAN 109. Although shown as occurring serially, the blocks of FIG. 3 may be reordered or parallelized depending on the implementation, as discussed below. It should be understood that the LAN device can be any LAN-based device that is in communication with the LAN 109, such as mobile devices 120A-N (e.g., smartphone, laptop computer, or tablet), digital television 106, network gateway 114, or set-top boxes 104A-N.

Beginning in step 300, network gateway 114 receives via a LAN 109, a first IoT device table from a first set-top box 104A. The first IoT device table has at least one IoT device entry corresponding to an IoT device 130 that includes at least one feature. The IoT device entry includes: (i) a LAN device address, such as a set-top box identifier, of the first set-top box 104A, (ii) information about the IoT device 130 (e.g. a model identifier), (iii) a feature identifier, and (iv) a feature status. Subsequently, in step 305, network gateway 114 stores the first IoT device table in an IoT device database.

Continuing to step 310, network gateway 114 periodically or asynchronously receives an update of the feature status of the IoT device 130 from the first set-top box 104A. The update of the feature status of the IoT device 130 from the first set-top box 104A.

In step 315, network gateway 114 receives a request for the IoT device database from a second set-top box 104B via the LAN 109. Finishing now in step 320, in response to receiving the IoT device database request, network gateway 114 retrieves the first IoT device table from the IoT device database and sends the first IoT device table to the second set-top box 104B. This first IoT device table or entire IoT device database can be sent to a LAN based device that is interfacing with the consumer so that the IoT device status screen can be displayed in a GUI of the LAN based device. The request for the IoT device database can be during power off or during runtime operation of the LAN based device.

In response to sending the first IoT device table, network gateway 114 may receive a command to control the IoT device 130 from the second set-top box 104B. As a result of receiving the control command, network gateway 114 sends the IoT device control command to control the IoT device 130 over the LAN 109 to the set-top box identifier of the first set-top box 104A. The example set-top box identifier is an internet protocol (IP) address.

Although not shown, network gateway 114 may receive a shutdown notification for the IoT device 130 from the first set-top box 104A via the LAN 109. In response to receiving the IoT device shutdown notification, network gateway 114 removes the IoT device entry from the IoT device database. Alternatively, the network gateway 114 maintains the IoT device entry in the IoT device database and updates the IoT device status to the powered down state.

Figure 4:
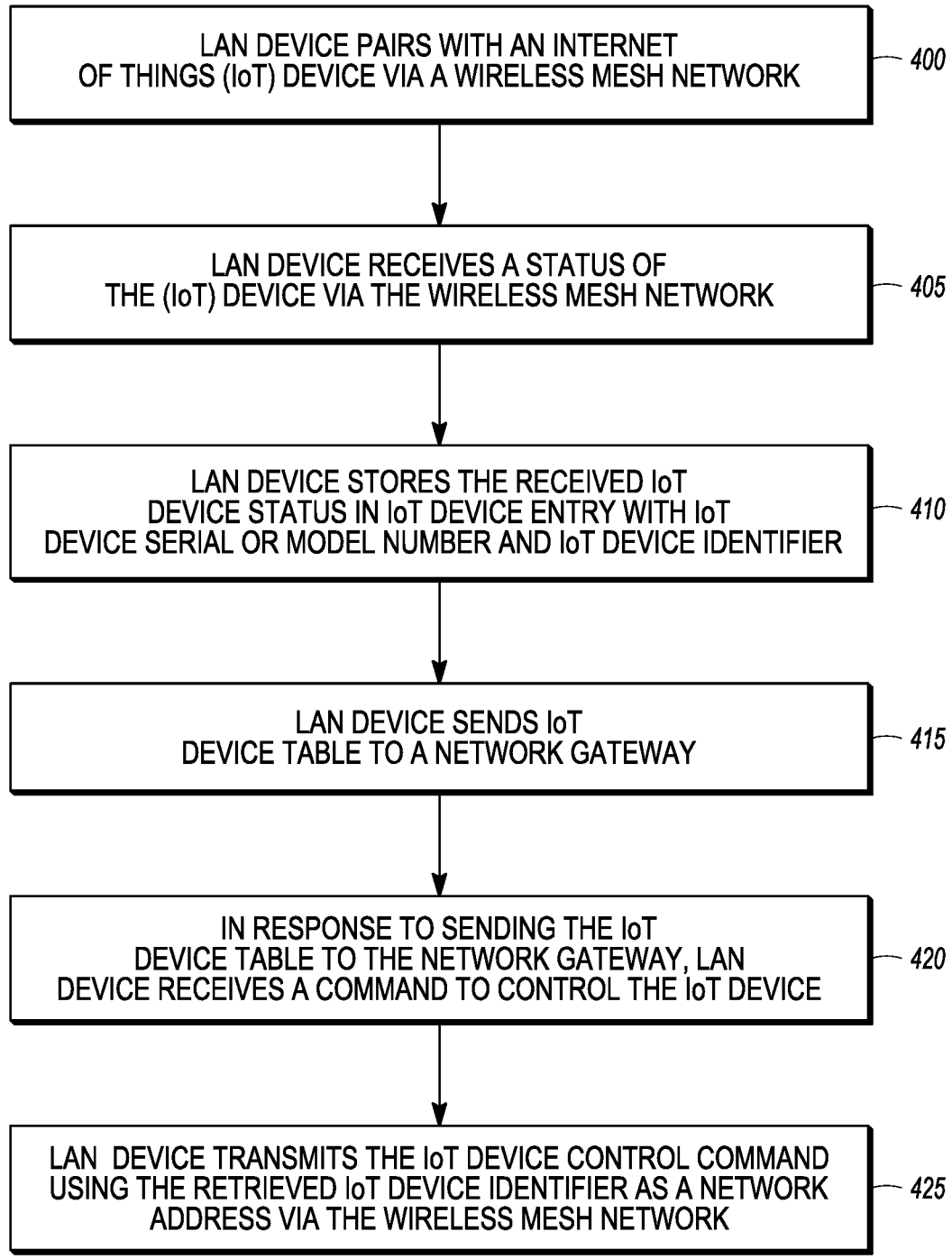
FIG. 4 is a flowchart of the operation of the mobile device in FIG. 1, when processing IoT device status and controlling an IoT device, such as via a wireless mesh network.

FIG. 4 is a procedural flow of the operation of a LAN device, such as the mobile device 120A in FIG. 1, when processing IoT device status and controlling an IoT device 130, such as via a wireless mesh network 110A. Although shown as occurring serially, the blocks of FIG. 4 may be reordered or parallelized depending on the implementation, as discussed below. It should be understood that the LAN device can be any LAN-based device that is in communication with the LAN 109, such as mobile devices 120A-N (e.g., smartphone, laptop computer, or tablet), digital television 106, network gateway 114, or set-top boxes 104A-N.

In step 400, mobile device 120A (smartphone) pairs with an IoT device 130 via a wireless mesh network 110A. Pairing can include receiving device information such as a serial or model number of the IoT device 130, assigning an IoT device identifier to the IoT device, generating an IoT device entry in an IoT device table stored in a memory, and storing the IoT device serial or model number and the IoT device identifier in the IoT device entry. The IoT device identifier can be a network (e.g. Bluetooth, DECT, NFC or ZigBee) address. It should be understood that other LAN based devices can be used in lieu of mobile device 120A to pair with IoT device 130, such as a digital television 106, set-top boxes 104A-N, network gateway 114, or mobile devices 120B-N (laptop computer or tablet).

Moving to step 405, mobile device 120A receives a status of the IoT device 130 via the wireless mesh network 110A. Continuing now to step 410, mobile device 120A stores the received IoT device status in the IoT device entry with the IoT device serial or model number and the IoT device identifier.

Subsequently, in step 415 mobile device 120A sends the IoT device table to the network gateway 114. Proceeding now to step 420, in response to sending the IoT device table to the network gateway 114, mobile device 120A receives a command to control the IoT device 130 from the network gateway 114. The command may include the IoT device information and/or the IoT device identifier and a control setting for the IoT device 130. Mobile device 120A then retrieves the control command for the IoT device 130 from the IoT device table in the memory.

Finishing now in step 420, the mobile device 120A transmits the IoT device control command using the retrieved IoT device identifier as a network address via the wireless mesh network 110A.

Although not shown, mobile device 120A can unpair from the IoT device 130 via the wireless mesh network or detect shutdown of the IoT device 130 after failing to receive communication from the IoT device 130 for a timeout period. In response to unpairing or detecting shutdown of the IoT device 130, mobile device 120A removes the IoT device entry from the IoT device table.

FIG. 5A shows an example graphical user interface (GUI) of the set-top box for displaying IoT device status. Once the consumer powers off one of the set-top boxes 104A-N of FIG. 1, the statuses of the IoT devices 130-136 are displayed on the television 106 for a length of time that may be configured by the consumer. The example IoT devices 130-136 may be Bluetooth, DECT, NFC or ZigBee enabled devices. If the consumer hits power off again the display can be immediately removed. The generated IoT device status GUI 500 shows an interface where the consumer can view the status of IoT devices 130-136, including oven status 510, security system status 520, outside light status 530, and car status 540. The IoT device status GUI 500 shows that the oven status 510 is on and set to 400 degrees, the security system status 520 is off, the outside light status 530 is on, and the car status is off.

FIG. 5B shows an example GUI of the set-top box for controlling IoT devices. Set top boxes 104A-N generate IoT device control GUI 550 that is displayed on the television monitor 106 to allow the consumer to configure IoT device status functionality. For example, if the consumer is departing a building and just powered off set-top box 104A, the consumer reads the displayed oven status 510 on the IoT device status GUI 500 and shuts off the oven 130 via interaction with the IoT device control GUI 550 by way of oven feature controls 560. The example IoT device control GUI 550 shown in FIG. 5B also includes security system control 570, outside light control 580, and car control 590.

Although not shown, the consumer can also configure the following via set-top boxes 104A-N: enable or disable a feature, configure the timeout for the display status to appear before the television monitor 106 gets shut off, and query the list of IoT devices 130-136 that are paired with all set-top boxes 104A-N connected to the LAN 109 throughout the consumer's residence which communicate IoT device status and have controllable features. IoT devices 130-136 may enumerate the features that are supported by the device, for example, oven 130 may indicates only on/off functionality is provided or may provide more elaborate functionality, for example to configure the oven settings. The consumer can enable specific feature controls, configure feature status, and issue commands to IoT devices 130-136 that are paired to any of the set-top boxes 104A-N in the home. For example, the consumer can enable all IoT devices 130-136 or a subset of IoT devices 130-136. Using set-top boxes 104A-N, the consumer can specify that a single power off of an individual set-top box 104A will display IoT status of all devices that have been configured in the previous step, read any consumer interaction with the GUI display, and send relevant commands to configure any controlled IoT devices. Multiple power off key strokes can clear the display and power off set-top box 104A.

Figure 6:
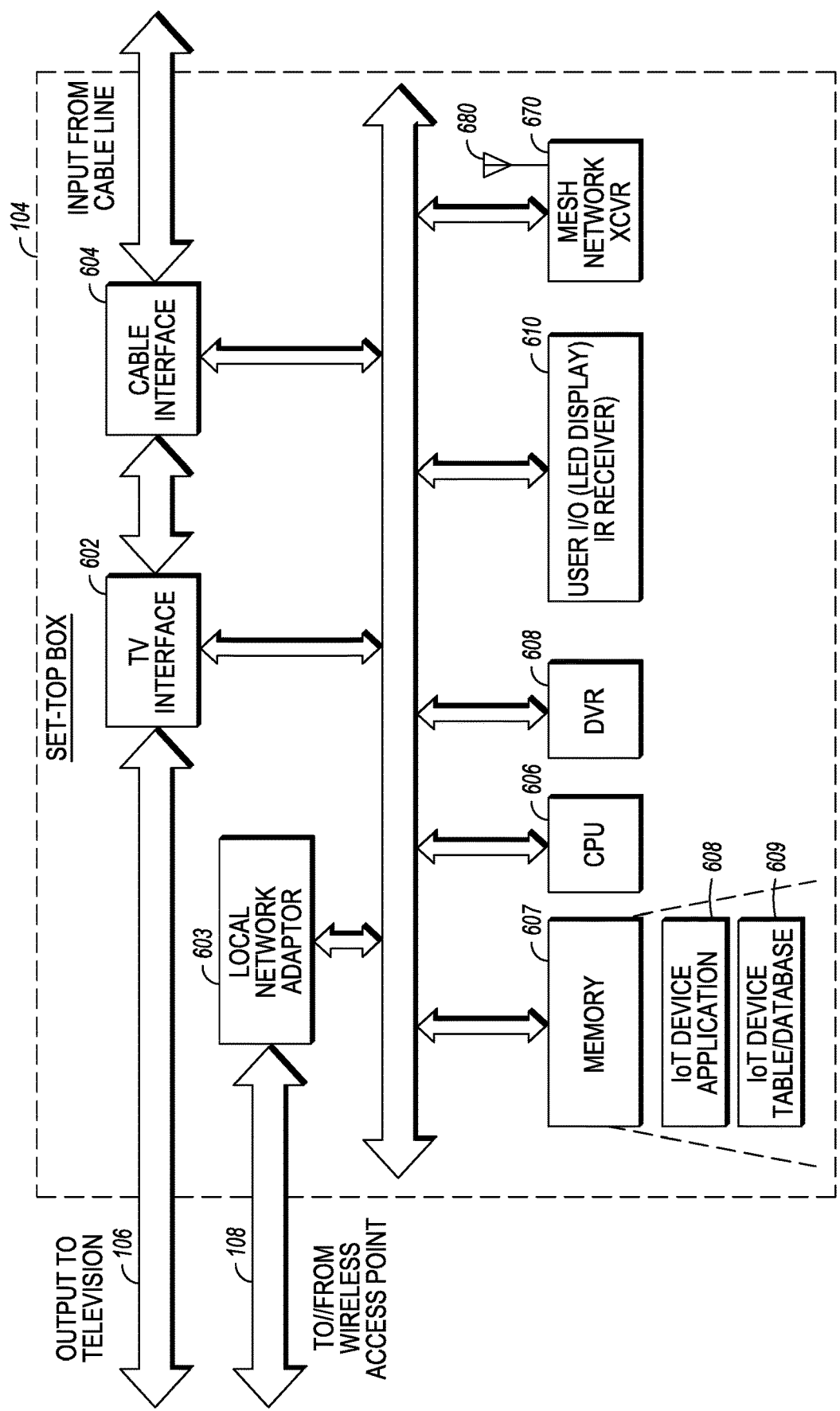
FIG. 6 shows an example of a hardware configuration for the set-top boxes in FIG. 1, in simplified block diagram form.

FIG. 6 shows an example of a hardware configuration for the set-top boxes 104A-N in FIG. 1, in simplified block diagram form. In this example, the STB 104 includes TV interface 602 for received television program data as well as for processing on-screen display data, e.g. displaying IoT device status and receiving input controls in GUIs that are output as visual content for display on a television 106.

The example STB 104 also includes an interface for local communication with end user devices, and in this example, the interface takes the form of a local network adaptor 603 for communication to/from the wireless access point 108. The STB 104 also includes cable interface 604 for receiving programming from the cable or satellite TV network 102 and supplying selected MPEG transport streams to the TV interface 602. The cable interface 604 also sends and receives data over the cable or satellite network 102 to the MSO server 101 to obtain media content, such as program transport streams, and possibly meta-data files or meta-data related instructions from the MSO server 101. The STB 104 may also communicate with the other STBs 104 via the cable interface 604.

The STB 104 also includes circuits forming one or more processors to implement a central processing unit (CPU) 606 that controls operations of the STB 104, including performing the processing to generate the IoT device status and/or control display on a television monitor after a consumer powers off the set-top box. The STB 104 may also include digital video recorder (DVR) 608 for storing media content and meta-data files. STB 104 may include one or more memories 607 and/or other program and data storage devices, for example, for storing instructions executable by the CPU 606 and an IoT device table or database 609. In the example, STB 104 includes an IoT device application 608 to perform the functions or procedures as described above, for example in FIGS. 1-2, and an IoT device table/database 609 as described in FIG. 2. Alternatively, the media forming the storage for the DVR function 608 may serve as the instruction storage as well. Specific types of working memories such as RAM and ROM for the CPU 606 are omitted for convenience. The set-top box communicates with a network gateway 114 and may communicate with one or more mobile device(s) 120A-N via local network adaptor 603 (wireless LAN communication interface).

The STB 104 also includes a user I/O device 610. The user I/O device 610 may include a liquid crystal device (LCD) or light emitting diode (LED) display for displaying information to the consumer watching the television 106. The user I/O device 610 may also include an infrared (IR) receiver for receiving instructions from the consumer's remote control.

STB 104 also includes an embedded wireless mesh network transceiver 670 that may be a short range wireless transceiver configured to communicate with IoT devices 130-136. Mesh network transceiver 670 includes an antenna 680 and may also be used to communicate with mobile devices 120A-N (e.g., smart phone, tablet, or laptop computer) and network gateway 114. The various wireless mesh network technologies may include (but are not limited to): ZigBee, Bluetooth, DECT, and NFC.

Figure 7:
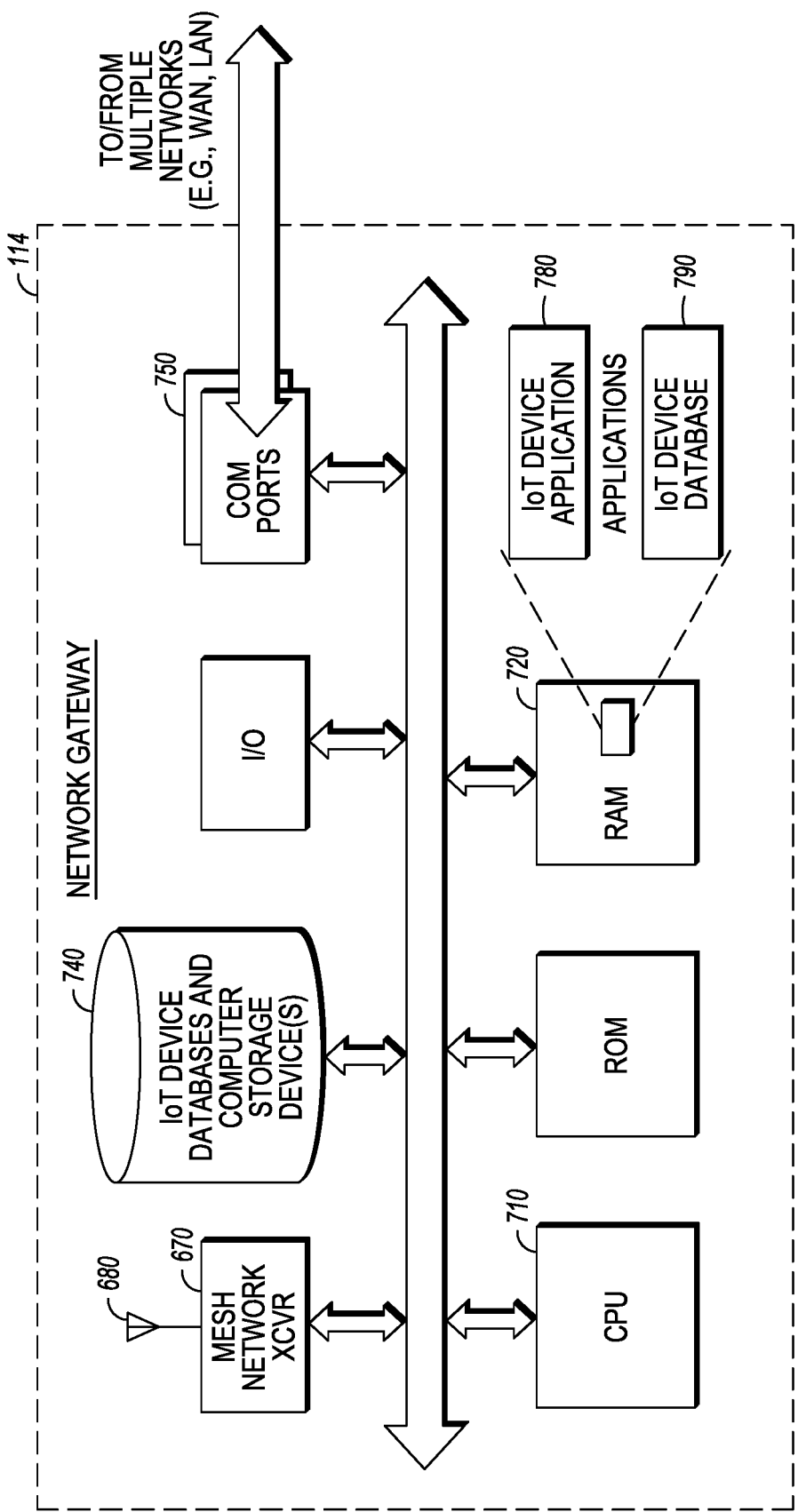
FIG. 7 shows an example of a hardware configuration for the network gateway in FIG. 1, in simplified block diagram form.

FIG. 7 shows an example of a hardware configuration for the network gateway 114 in FIG. 1, in simplified block diagram form. The network gateway 114 may be configured as a server or host to function as any of the computer platforms in FIG. 1. For example, the MSO server 101 shown in the system of FIG. 1 may be implemented in a somewhat similar fashion, although the MSO server 101 is typically optimized for video content and related cable TV type network services or the like.

The network gateway 114 includes a CPU 710, in the form of one or more processors, for executing program instructions. Although the processor(s) forming the CPU 710 may be similar to the processor used in the STB 104, host or server computer platforms typically use somewhat different circuit architectures, e.g. to provide more processor power. Network gateway 114 also includes a memory 720, such as RAM, that is accessible to the processor to temporarily store IoT device status, IoT device control commands, IoT device database 790 and execute various programming instructions. The memory 720 typically stores programming, such as IoT device application 780. Execution of the programming by the processor 710 configures the network gateway 114 to perform the functions or procedures as described above, for example in FIGS. 1-2.

In general, the term "application," as used herein, refers to logic embodied in hardware or software instructions, which can be written in a programming language, such as Java™, C, C++, C#, for example. A software application can be compiled into executable programs or written in interpreted programming languages, such as Perl, Visual Basic script, HTML, or JavaScript. Software applications may be callable from other applications. Generally, applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this example, the network gateway 114 is shown as including the databases and computer storage device(s) 740, such as to persistently store IoT device tables and databases, as discussed earlier. The databases and computer storage device(s) 740 are accessible to the central processing unit (CPU) 710 of the network gateway 114.

Network gateway 114 includes a network communication interface, shown generally as com ports 750, such as coaxial, optical, Ethernet, and/or wireless LAN communication ports. The com ports 750 may use any available data communication technology. In a fixed installation, for example, the com ports 750 may include an Ethernet interface card for communication over appropriate data network wiring. For a wireless implementation, the com ports 750 may include a Wi-Fi transceiver. Com ports 750 allow the network gateway 114 to communicate with other devices and systems, such as set-top boxes 104A-N and mobile devices 120A-N via LAN 109; and over the cable or satellite network 102 (WAN) with MSO server 101.

The example network gateway 114 also includes embedded wireless mesh network transceiver 670 that is a short range wireless transceiver configured to communicate with IoT devices 130-136. Mesh network transceiver 670 includes an antenna 680 and may be used to communicate with set-top boxes 104A-N, mobile devices 120A-N (e.g., smart phone, tablet, or laptop computer) and/or the IoT devices 130-136. The various wireless mesh network technologies may include (but are not limited) to: ZigBee, Bluetooth, DECT, and NFC.

Figure 8:
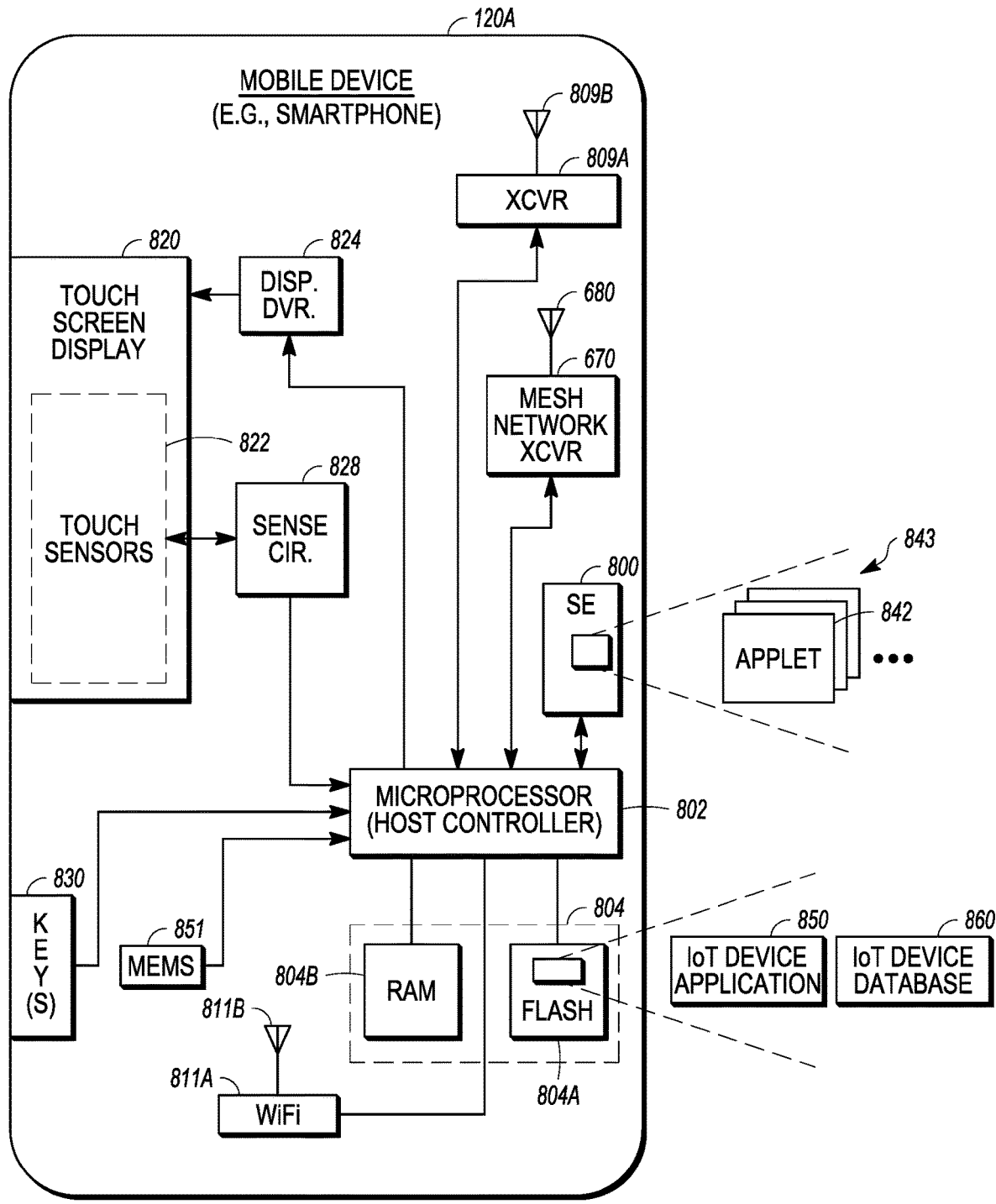
FIG. 8 shows a hardware configuration of a mobile device in FIG. 1, in simplified block diagram form.

FIG. 8 is a high-level functional block diagram of an example of a mobile device, such as smartphone 120A, that communicates via the system 100 of FIG. 1.

Shown are elements of a touch screen type of mobile device having the IoT device application 120 loaded, although other non-touch type mobile devices can be used in the IoT device status communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides a block diagram illustration of the example smartphone 120A having a touch screen display for displaying content and receiving user input as (or as part of) the user interface.

The activities that are the focus of discussions here typically involve data communications. As shown in FIG. 8, the smartphone 120A includes at least one digital transceiver (XCVR) 809a, for digital wireless communications via a wide area wireless mobile communication network, although the smartphone 120A may include additional digital or analog transceivers (not shown). The transceiver 809a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 809a provides two-way wireless communication of information including digitized audio signals, still image and/or video signals, web page information for display as well as web related inputs, and various types of mobile message communications to/from the smartphone 120A.

Several of these types of communications through the transceiver 809a and a network, as discussed previously, relate to protocols and procedures in support of communications with the set-top box 104A-N, network gateway 114, IoT devices 130-136, and wireless access point 108 for processing IoT device status and controlling IoT devices. Such communications, for example, may utilize IP packet data transport utilizing the digital wireless transceiver (XCVR) 809a and over the air communications to and from the set-top boxes 104A-N via the wireless access point 108 and network gateway 114 shown in FIG. 1.

In one example, the transceiver 809a sends and receives a variety of signaling messages in support of various data services provided by a network of a wireless service provider, to user(s) of smartphone 120A via a mobile communication network (not shown). Transceiver 809a connects through radio frequency (RF) send-and-receive amplifiers (not shown) to an antenna 809b.

Many modern mobile device(s), such as smartphone 120A, also support wireless local area network communications over Wi-Fi, instead of or in addition to data communications using the wide area mobile communication network. Hence, in the example of FIG. 8, for packet data communications, smartphone 120A also includes a Wi-Fi transceiver 811a and associated antenna 811b. Although Wi-Fi is used here as the example, the transceiver 811a may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX.

The transceiver 811a, for example, may provide two-way data transport for wireless communication with a wireless access point (shown in FIG. 1) in a residence or enterprise that the user frequents or with any available hotspot offered in a public venue. A Wi-Fi access point communicates with compatible user equipment, such as the smartphone 120A, over the air using the applicable Wi-Fi protocol. The Wi-Fi access point provides network connectivity. In a home or office premises, for example, the Wi-Fi access point would connect directly or via a local area network (LAN) 109 to a line providing internet access service. In a more public venue, an access point configured as a hotspot may offer similar connectivity for customers or others using the venue, on terms and conditions set by the venue operator. Although communicating through a different network or networks, the transceiver 811a supports various types of data communications similar to the packet data communications supported via the mobile network transceiver 809a, including communications related to communications to and from set-top boxes 104A-N and the other devices shown in FIG. 1.

The example smartphone 120A includes a wireless mesh network transceiver 670 to communicate and interact with proximate wireless mesh network devices, such as IoT devices 130-136. The embedded wireless mesh network transceiver 670 can be a short range wireless transceiver. Mesh network transceiver 670 includes an antenna 680 and may also be used to communicate with set-top boxes 104A-N, network gateway 114, and other mobile devices 120B-N (e.g., laptop computer or tablet). The various wireless mesh network technologies may include (but are not limited to): ZigBee, Bluetooth, DECT, and NFC.

The smartphone 120A further includes a microprocessor, sometimes referred to herein as the host controller 802. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 802, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in smartphone 120A, laptop computer 120B, and tablet 120N.

Returning more specifically to the smartphone 120A example of FIG. 8, the microprocessor 802 serves as a programmable host controller for the mobile device by configuring the mobile device to perform various operations, for example, in accordance with instructions or programming executable by processor 802. For example, such operations may include various general operations of the smartphone 120A, as well as operations related to communications with set-top boxes 104A-N. Although a processor may be configured by use of hardwired logic, typical processors in mobile devices are general processing circuits configured by execution of programming.

The smartphone 120A includes a memory or storage system 804, for storing data and programming. In the example, the memory system 804 may include a flash memory 804a and a random access memory (RAM) 804b. The RAM 804b serves as short term storage for instructions and data being handled by the processor 802, e.g. as a working data processing memory. The flash memory 804a typically provides longer term storage.

Hence, in the example of smartphone 120A, the flash memory 804a is used to store programming or instructions for execution by the processor 802. Depending on the type of device, the smartphone 120A stores and runs a mobile operating system through which specific applications, including IoT device application 850 (which may be a web browser executing a dynamic web page), run on smartphone 120A. Examples of mobile operating systems include Google Android, Apple iOS (I-Phone or iPad devices), Windows Mobile, Amazon Fire OS, RIM BlackBerry operating system, or the like. Flash memory 804a may also be used to store mobile configuration settings for different mobile applications or services executable at smartphone 120A using processor 802, such as IoT device database 860.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The laptop computer 120B, tablet computer 120N, and wireless access point 108, and IoT devices 130-136 of FIG. 1 can be implemented in a somewhat similar fashion. A computer type user terminal device such as a PC, laptop computer, or tablet computer similarly includes one or more data communication interfaces (represented by COM ports), circuits forming one or more processors to implement a central processing unit (CPU) functionality, main memory and one or more mass storage devices for storing user data and the various executable programs for sending IoT device status and receiving IoT device controls. A mobile device type user terminal and IoT device may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Program aspects of the technology may be thought of as "products" or "articles of manufacture" typically in the form of executable code and/or associated data that is carried on or embodied in a type of machine readable medium. For example, programming code could include code for the server or the sending device for generating meta-data files and programming for the receiving device for reproducing content based on the meta-data files. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A local area network (LAN) device, comprising:
a wireless mesh network communication interface for communication over a wireless mesh network;
a LAN communication interface for communication over the LAN;
a processor coupled to the wireless mesh and LAN network communication interfaces;
a memory accessible to the processor; and programming in the memory, wherein execution of the programming by the processor configures the LAN device to perform functions, including functions to:
pair the LAN device with an internet of things (IoT) device via the wireless mesh network;
receive a status corresponding to an overall status of the IoT device or the status of a feature of the IoT device via the wireless mesh network;
store the received IoT status with an IoT device identifier of the IoT device in an IoT device table in the memory;
detect a shutdown signal to power down the LAN device; and
upon detecting the shutdown signal, retrieve an IoT device database including the IoT device status from the memory and send the IoT device status to a display device,
wherein pairing with the IoT device includes:
receiving information about the IoT device;
assigning the IoT device identifier to the IoT device;
generating an IoT device entry in the IoT device table;
storing the IoT device serial or model number and the IoT device identifier in the IoT device table; and
wherein the received IoT device status is stored in the IoT device entry with the IoT serial or model number and the IoT device identifier.

2. The LAN device of claim 1:
wherein the display device is a mobile device, television, or video monitor and the LAN device sends the IoT device status to the display device for display for a predetermined time period; and
wherein the IoT device identifier is a Bluetooth ZigBee Digital Enhanced Cordless Telecommunications (DECT), or Near Field Communication (NFC) address.

3. The LAN device of claim 1, wherein execution of the programming by the processor further configures the LAN device to perform functions to:
receive IoT device information of a second IoT device and a status of the second IoT device from a mobile device via the LAN, wherein the second IoT device is paired with the mobile device;
generate a second IoT device entry in the IoT device table; and
store the second IoT device serial or model number, the second IoT device identifier, the second IoT device status in the second IoT device entry.

4. The LAN device of claim 3, wherein the second IoT device identifier is the internet protocol (IP) address of the mobile device.

5. The LAN device of claim 1, wherein execution of the programming by the processor further configures the LAN device to perform functions to:
in response to sending the IoT device status for display, receive an input to control an IoT device feature;
access a control profile of the IoT device from the memory that includes controllable features of the IoT device and corresponding control commands to adjust the controllable features;
retrieve a control command from the control profile based on the received input to control the IoT device feature; and
transmit the retrieved IoT device control command to the IoT device via the wireless mesh network.

6. The LAN device of claim 1, wherein execution of the programming by the processor further configures the LAN device to perform functions to:
transmit the IoT device status over the LAN to a second LAN device via a network gateway;

receive over the LAN via the network gateway statuses of other IoT devices paired with the second LAN device via a second wireless mesh network; and store the received other IoT device statuses in memory in the IoT device table.

7. The LAN device of claim 6, wherein the LAN device receives the other IoT device statuses before detecting the shutdown signal and the execution of the programming by the processor further configures the LAN device to perform functions to: in response to receiving over the LAN via the network gateway the statuses of other IoT devices, send the received other IoT device statuses to the display device for display upon detecting the shutdown signal.

8. The LAN device of claim 1, wherein the IoT device status and the IoT device identifier are stored in an entry of the IoT device table and the entry further includes: (i) information identifying the IoT device, and (ii) an identifier of the LAN device or a mobile device that the IoT device is paired with.

9. The LAN device of claim 8, wherein the identifier of the LAN device or the mobile device that the IoT device is paired with is an internet protocol (IP) address and the information identifying the IoT device is at least one of a model number, serial number, network address, or industry standard to which the IoT device complies.

10. The LAN device of claim 8, wherein the entry of the IoT device table further includes each feature of the IoT device that is controllable and status of each IoT device controllable feature.

11. A method comprising:
receiving at a network gateway via a local area network (LAN), a first internet of things (IoT) device table from a first local area network (LAN) device, the first IoT device table having at least one IoT device entry corresponding to an IoT device that includes at least one controllable feature, the IoT device entry including: (i) a LAN device address of the first LAN device, (ii) information identifying the IoT device, (iii) a feature identifier of the controllable feature, and (iv) a feature status of the controllable feature; storing the first IoT device table in an IoT device database;

periodically receiving an update of the feature status of the IoT device from the first LAN device;

receiving a request for the IoT device database from a second LAN device via the LAN; and in response to receiving the IoT device database request, retrieving the first IoT device table from the IoT device database and sending the first IoT device table to the second LAN device and to a display device to indicate the connection of the IoT device to users, including when the IoT device is powered down and removed from the LAN to indicate that the IoT device is available to reconnection to the LAN.

12. The method of claim 11, further comprising:
in response to sending the first IoT device table, receiving a command to control the IoT device from the second LAN device; and sending the IoT device control command to control the IoT device over the LAN to the first LAN device via an internet protocol (IP) message, wherein the IP message addressed to an internet protocol (IP) address of the LAN device.

13. The method of claim 11, wherein the network gateway receives the update of the feature status of the IoT device from the first LAN device by asynchronous notification from the first LAN device.

14. The method of claim 11, wherein the network gateway periodically receive the update of the feature status of the IoT device from the first LAN device synchronously by polling the feature status at a predetermined time period.

15. The method of claim 11, further comprising:
receiving a shutdown notification of the IoT device from the first LAN device via the LAN; and in response to receiving the IoT device shutdown notification, removing the IoT device entry from the IoT device database.

16. The method of claim 11, further comprising:
receiving a shutdown notification of the IoT device from the first LAN device via the LAN; and in response to receiving the IoT device shutdown notification, maintaining the IoT device entry in the IoT device database and updating the IoT device status to a powered down state.

* * * * *